(12) United States Patent
Quappen et al.

(10) Patent No.: US 10,046,833 B2
(45) Date of Patent: Aug. 14, 2018

(54) TETHER FOR SUBMERGED MOVING VEHICLE

(71) Applicant: Minesto AB, Västra Frölunda (SE)

(72) Inventors: Arne Quappen, Göteborg (SE); Olof Marzelius, Västra Frölunda (SE)

(73) Assignee: MINESTO AB, Västra, Frölunda (SE)

( * ) Notice: Subject to any disclaimer, the term of this patent is extended or adjusted under 35 U.S.C. 154(b) by 91 days.

(21) Appl. No.: 14/369,152

(22) PCT Filed: Dec. 21, 2012

(86) PCT No.: PCT/SE2012/051473
§ 371 (c)(1),
(2) Date: Jun. 26, 2014

(87) PCT Pub. No.: WO2013/100849
PCT Pub. Date: Jul. 4, 2013

(65) Prior Publication Data
US 2014/0352293 A1    Dec. 4, 2014

(30) Foreign Application Priority Data

Dec. 27, 2011 (EP) .................................. 11195789

(51) Int. Cl.
*F03B 13/10* (2006.01)
*F03B 17/06* (2006.01)
(Continued)

(52) U.S. Cl.
CPC ............ *B63B 21/50* (2013.01); *B63B 21/663* (2013.01); *F03B 13/10* (2013.01); *F03B 17/06* (2013.01);
(Continued)

(58) Field of Classification Search
CPC ........ F03B 17/06; F03B 17/061; F03B 13/10; F03B 13/1885; F03B 13/1895;
(Continued)

(56) References Cited

U.S. PATENT DOCUMENTS 2,397,957 A * 4/1946 Freeman ............... B63B 21/663
114/243
2,859,836 A * 11/1958 Wiener ................. B63B 21/663
114/243
(Continued)

FOREIGN PATENT DOCUMENTS

CN         1761815 A      4/2006
CN       101379291 A      3/2009
(Continued)

OTHER PUBLICATIONS

Extended European Search Report received for European Patent Application No. 11195789.0, dated May 24, 2012, 6 pages.
(Continued)

*Primary Examiner* — Mark Laurenzi
*Assistant Examiner* — Xiaoting Hu
(74) *Attorney, Agent, or Firm* — Morrison & Foerster LLP

(57) ABSTRACT

The present invention relates to a tether for connecting a moving device submerged in liquid to a support structure, e.g. a submersible power plant comprising a stream-driven vehicle provided with at least one turbine for generation of electrical energy. The tether extends in a main direction, and at least a tether portion of the tether comprises a tensile force bearing portion extending in the main direction of the tether, wherein the tether portion is arranged to strive to self-align in relation to a relative flow direction of the liquid during use.

16 Claims, 5 Drawing Sheets

(51) Int. Cl.
*B63B 21/50* (2006.01)
*B63B 21/66* (2006.01)

(52) U.S. Cl.
CPC ........ *F03B 17/061* (2013.01); *B63B 2205/00* (2013.01); *F05B 2240/917* (2013.01); *F05B 2240/97* (2013.01); *Y02E 10/28* (2013.01); *Y02E 10/38* (2013.01)

(58) Field of Classification Search
CPC .. F03B 13/20; F03B 13/264; F05B 2240/917; F05B 2240/97; B63B 21/50; B63B 21/663; B63B 2205/00
See application file for complete search history.

(56) References Cited

U.S. PATENT DOCUMENTS

| | | | | |
|---|---|---|---|---|
| 2,949,090 | A | * | 8/1960 | Gerber ................. B63B 21/663 114/243 |
| 3,176,646 | A | * | 4/1965 | Natwick ............... B63B 21/663 114/243 |
| 3,611,976 | A | * | 10/1971 | Hale ...................... H01B 7/045 114/243 |
| 3,613,627 | A | | 10/1971 | Kennedy |
| 4,075,967 | A | * | 2/1978 | Silvey ..................... H02G 1/10 114/243 |
| 2009/0185904 | A1 | * | 7/2009 | Landberg ............... F03B 17/00 416/131 |
| 2009/0278353 | A1 | * | 11/2009 | Da Costa Duarte Pardal ................................ F03D 5/00 290/44 |
| 2009/0289148 | A1 | * | 11/2009 | Griffith ............... B63H 9/0685 244/155 R |
| 2010/0264660 | A1 | * | 10/2010 | Suzuki ...................... B63J 3/02 290/54 |
| 2011/0266395 | A1 | * | 11/2011 | Bevirt ...................... F03D 5/00 244/155 R |
| 2011/0305518 | A1 | * | 12/2011 | Pearce .................... B63B 35/44 405/75 |
| 2013/0334823 | A1 | * | 12/2013 | Hopper ................. F03B 13/264 290/54 |

FOREIGN PATENT DOCUMENTS

| | | |
|---|---|---|
| EP | 1816345 A1 | 8/2007 |
| EP | 2216543 A1 | 8/2010 |
| JP | 56-157684 A | 12/1981 |
| JP | 2009-525427 A | 7/2009 |
| MX | PA06013979 A | 3/2007 |
| WO | 2004083629 A1 | 9/2004 |
| WO | 2005/119052 A1 | 12/2005 |
| WO | 2007/101756 A1 | 9/2007 |
| WO | 2009/142762 A1 | 11/2009 |
| WO | 2012/123704 A2 | 9/2012 |

OTHER PUBLICATIONS

International Preliminary Report on Patentability received for PCT Patent Application No. PCT/SE2012/051473, dated Mar. 19, 2014, 6 pages.

International Search Report and Written Opinion received for PCT Patent Application No. PCT/SE2012/051473, dated Apr. 16, 2013, 14 pages.

Office Action received for Chinese Patent Application No. 201280065297.9, dated Dec. 1, 2015, 12 pages (3 pages of English Translation and 9 pages of Official Copy).

Intention to Grant received for European Patent Application No. 11195789.0, dated Apr. 5, 2016, 7 pages.

Decision to Grant received for European Patent Application No. 11195789.0, dated Jan. 5, 2017, 2 pages.

Office Action received for Chilean Patent Application No. 2014-001733, dated Jan. 20, 2017, 12 pages of Official Copy only. (see Communication under 37 § 1.98(a) (3)).

Office Action received for Japanese Patent Application No. 2014-550241, dated Oct. 3, 2016, 8 pages (4 pages of English Translation and 4 pages of Official Copy).

Office Action received for Japanese Patent Application No. 2014-550241, dated May 15, 2017, 11 Pages (6 pages of English Translation and 5 pages of Official Copy).

* cited by examiner

TETHER FOR SUBMERGED MOVING VEHICLE

CROSS REFERENCE TO RELATED APPLICATIONS

This application is a U.S. National Phase patent application of PCT/SE2012/051473, filed on Dec. 21, 2012, which claims priority to European Patent Application No. 11195789.0, filed on Dec. 27, 2011, each of which is hereby incorporated by reference in the present disclosure in its entirety.

FIELD OF THE INVENTION

The present invention relates to a tether for connecting a moving device submerged in liquid, such as water, to a support structure. For example, the moving device may be a stream-driven vehicle of a submersible power plant, which vehicle is provided with at least one turbine for generation of electrical energy.

BACKGROUND OF THE INVENTION

Streams and ocean currents, such as tidal stream flows, provide a predictable and reliable source of energy that can be used for generating electrical energy. Stationary, or fixed, power plant systems are known which are submerged and secured in relation to the stream or flow, wherein a turbine is used to generate electrical energy from the flow velocity of the stream. A drawback with stationary stream-driven power plant systems, however, is that the amount of generated electrical energy from a single turbine of a certain size is low, which may be compensated by increasing the number of turbines, or increasing the effective area of the turbines. Those solutions, however, lead to cumbersome and expensive manufacturing, handling and operation of the fixed stream-driven power plant systems. Turbines may also be designed for installation in specific locations having high local flow speeds. This also leads to more complex and costly installation and handling. Moreover, access to such high flow speed locations is relatively limited.

In order to improve the efficiency of the electrical energy generation from tidal stream flows and ocean currents, it is known to provide a submersible power plant system comprising a stream-driven vehicle, as described in e.g. EP 1816345 by the applicant and fully incorporated herein by reference. The stream-driven vehicle typically comprises a wing which is designed to increase the speed of the vehicle by utilizing the stream flow and the resulting hydrodynamic forces acting on the wing. In more detail, the increased speed of the vehicle is achieved by counteracting the stream flow and hydrodynamic forces acting on the vehicle by securing the vehicle to a support structure, typically located at the seabed, by means of a wire member, wherein the vehicle is arranged to follow a certain trajectory which is limited by the length, or range, of the wire. The vehicle is further provided with a turbine coupled to a generator for generating electrical energy while the vehicle moves through the water, wherein the speed of the vehicle influences and contributes to the relative flow velocity at the turbine. The speed of the vehicle allows for that the relative flow velocity at the turbine may be considerably increased in relation to the absolute stream flow speed. Hence, the vehicle of the stream-driven submerged power plant does typically not require for use of a gear box, since the turbine is subjected to a high relative water speed which generates a sufficient, or more efficient, rotational speed for the generator.

One drawback associated with current solutions of power plant systems comprising a stream-driven vehicle is that the drag force acting on the power plant system reduces the efficiency of the electrical energy generation. An additional consideration of stream-driven submersible power plant systems is that they are mounted and arranged to operate in a submerged location, being difficult to access. Hence, handling and servicing of those systems is cumbersome. Accordingly, currently available, or known, stream-driven submersible power plant systems, and parts thereof, limit the maximal capability of efficiently generating electrical energy. Also, there is a desire to further develop the design and operation of such systems in order to facilitate for easier handling and for more efficient mounting, and to provide improved operation and more durable constructions.

SUMMARY OF THE INVENTION

In view of the above-mentioned and other drawbacks of the prior art, a general object of the present invention is to provide an improved tether for connecting a device submerged in liquid, such as a stream-driven vehicle of a submersible power plant system, to a support structure, wherein the tether provides more efficient and durable operation and handling of the submerged device.

According to an aspect of the invention, there is provided a tether for connecting a device submerged in liquid to a support structure, which tether extends in a main direction, wherein at least a tether portion of the tether comprises an outer shape having a leading edge and a trailing edge, each edge extending in the main direction, and at least one tensile force bearing portion extending in the main direction of the tether. Furthermore, the tether portion is arranged to strive to self-align in relation to a relative flow direction of the liquid, by rotating around a rotational, or torsional, axis which is essentially parallel with the main direction of the tether, when the tether portion is moving through the liquid, or in relation to the liquid.

As noted, the tether comprises at least one self-aligning tether portion in the main direction, which tether portion strives to align with the direction of the relative liquid flow acting on that portion of the tether during its relative movement in relation to the liquid flow. Hence, the at least one portion of the tether will self-align, or strive to self-align, according to relative local hydrodynamic and other physical conditions at that specific tether portion, which improves operation of the tether at least at that specific tether portion.

The self-alignment of the tether portion advantageously reduces drag forces and reduces undesired lift forces acting on the tether portion while being in motion in relation to the liquid. In more detail, undesired lift forces on a tether portion which may force the tether in a direction of the lift force such that the tether is bent sideways in an undesired manner, may be reduced, or avoided, For example, bending of the tether may cause unbalanced drag forces acting on the tether during operation, and/or reduce the capability of the tether to support tensile forces between the device and the support structure in a suitable manner, e.g. in an essentially straight line between the device and the support structure. Hence, the tether portion will operate in a more efficient manner which results in that a supported submerged device will be less affected by drag and lift forces acting on the tether. For example, the tether portion may constitute an arbitrary short or long part of the complete tether, which part at least partly extends in the main direction. The tether portion may also comprise essentially the complete tether, or the tether portion may be formed of a separate tether section of a defined length in the main direction, which section self-aligns, or strives to self-align, essentially as a single unit, wherein the tether may comprise one such tether section or a plurality of such tether sections consecutively connected in the main direction.

The tether is for example suitable for connecting and supporting a submerged device which moves in relation to the liquid, wherein the relative direction of movement between the device and the liquid varies, or changes, over time. As an example, the tether may advantageously be used for connecting a submerged device which moves, at least periodically, in a direction which is at least partly transversal, or angled, in relation to a liquid flow direction. Such a submerged device may for instance comprise a stream-driven vehicle of a submerged power plant which is arranged to move along a desired trajectory, typically a suitable never ending trajectory, within the range of the tether, wherein the vehicle utilizes the liquid flow and the hydrodynamic forces acting on the wing in combination with the counteracting force of the tether to generate a relative vehicle speed at least 2 times, or 4 times, or 10 times, or 20 times the liquid flow speed. Hence, the stream-driven vehicle may travel with a speed which is higher, or substantially higher, than the liquid flow speed.

The tether may also advantageously be used for connecting a submerged device which is moved or moving in a substantially non-moving, or moving, liquid, wherein the device is towed by a moving support structure, such as a ship, or vessel. Furthermore, the tether may advantageously be used for connecting and supporting a submerged device which is fixed or secured in an essentially fixed submerged position in a stream or at a location comprising a liquid flow, wherein the liquid flow direction may, or at least occasionally do, change or alternate its direction.

The tether comprises a main direction which is the main direction in which the tether extends, that is, during use, between the device and the support structure. The outer shape of the tether portion(s) comprises a leading edge and a trailing edge, in analogy with a wing profile. The leading edge forms the forward portion of the tether portion, defined in an intended forward, or longitudinal, direction of the tether when it moves in an, at least partly, aligned state through the liquid during operation. In other words, the leading edge is the part of the tether portion that first contacts a theoretical liquid element, which element travels, in relation to the tether portion, along any one of two lateral surfaces, or sides, of the tether portion towards the trailing edge. The trailing edge typically is the rear edge of the tether portion, where the relative liquid flow separated by the leading edge may rejoin after passing outside the opposing lateral surfaces of the tether portion, during a laminar flow condition. The leading edge and trailing edge may further be defined in relation to the tether portion itself without regards to if the tether portion experience, or operates under, non-normal conditions, wherein e.g. the trailing edge may become the leading edge in relation to the direction of the movement of the tether.

The at least one tensile force bearing portion is arranged to uptake and support the tensile forces exerted on the tether essentially in the main direction, during use. The tensile force bearing portion may for example comprise one, or a plurality of, tensile force bearing members which are arranged inside the outer shape of the tether portion. The tensile force bearing portion may further form part of the outer shape. Also, the at least one tensile force bearing portion may be formed of one unified member extending in the main direction, or comprise suitably connected separate tensile members, in the main direction, which form the tensile force bearing portion.

The tensile force bearing portion may also comprise two, or a plurality of, essentially parallel members which extend along each other essentially in the main direction in the tether portion. Each such essentially parallel tensile member may extend throughout the full length of the tether or the tether portion, or be joined, or lengthened, jointly or independently in relation to the other parallel tensile member(s). Furthermore, essentially parallel tensile members may be arranged in different configurations in relation to each other in a plane having a normal direction coinciding with the main direction. For example, essentially parallel tensile members may be spread out inside the tether portion, wherein the combined tensile force bearing properties of a set of essentially parallel tensile members comprise, or form, a resulting center point of the tensile force bearing portion, which may be located outside of the set of parallel tensile members depending on their mutual configuration in relation to each other. For example, the tensile members may be spread out in a forward/aftward direction of the tether in order to achieve a thinner and more efficient tether due to less drag. Such a configuration of the tensile members is further advantageous in that flexing of the tether, both in terms of elastic bending and elastic torsional properties, may be improved.

During use of the tether according to an exemplifying embodiment of the present invention, the tether portion is advantageously further configured to withstand the lateral forces exerted on its lateral sides in an improved manner. Hence, the internal structure is sufficiently rigid, and may comprise support portions, such that the outer shape of the tether portions may be essentially maintained in its intended shape during heavy loads, for example while the tether is being subjected to high pressure from the surrounding liquid. For example, according to various exemplifying embodiments, the structure of the tether portion is designed to support, and withstand, lateral forces by being formed of a homogenous suitable material, or comprises an external load bearing shell member, or combinations thereof. In a similar manner, the leading edge of the tether portion is designed to withstand heavy loads, or high pressures, occurring during use.

According to various exemplifying embodiments, the leading edge, or the leading edge and the surrounding and/or adjacent outer portions having a normal direction directed at least partly in the forward direction, may be formed of a unified outer portion, and may further have e.g. an even, essentially even, rough and/or continuous or discontinuous outer surface.

According to an exemplifying embodiment of the present invention, the rotational axis is located in front of a hydrodynamic center point of pressure of the tether portion, in a forward direction from the trailing edge to the leading edge essentially perpendicular to the main direction.

According to a further exemplifying embodiment of the present invention, a resulting center point of the tensile force bearing portion is located in front of the hydrodynamic center point of pressure of the tether portion, in the forward direction.

The position of the resulting center point of the tensile force bearing portion partly defines the location of the tether portion rotational axis and, advantageously, a strive to self-align is achieved if the resulting rotational axis of the tether portion is located in front of the hydrodynamic center point of pressure, in a forward direction from the trailing edge to the leading edge essentially perpendicular to the main direction, where the hydrodynamic center point of pressure is the point where the resulting hydrodynamic forces meet/intersect and no resulting moment acts.

In more detail, a moment arm between the hydrodynamic center point of pressure and the tether portion rotational axis, which is partly given by the location of the resulting center point of the main tensile load bearing portion, may be provided during use of the tether with a device moving in a liquid having a flow velocity, which moment arm causes a self-aligning moment around the rotational axis, essentially parallel to the main direction of the tether portion, on the tether portion in relation to the direction of the relative liquid flow acting on that portion of the tether. Hence, the hydrodynamic forces act to stabilize the tether portion essentially around a pitch axis in a situation in which the tether portion is not aligned with the relative liquid flow.

The above described resulting center point may be further described as a weighted center point of e.g. a plurality of tensile members which form the tensile force bearing portion. Hence, e.g. the resulting center point of the tensile force bearing portion is not limited to be located in the geometrical center point of a plurality of tensile force bearing members. For example, the main share of tensile members are typically located in a front part of the tether such that also the resulting center point of the tensile force bearing portion is located in the front part of the tether.

For example, according to various exemplifying embodiments of the present invention, the resulting center point of the tensile force bearing portion, during use, is located in a leading third part, or in a leading fourth part, or in a leading fifth part, or in a leading tenth part, or in a leading twentieth part of the tether portion.

Furthermore, according to an exemplifying embodiment of the invention, the tether portion comprises a forward portion comprising the leading edge, and a trailing portion comprising the trailing edge, wherein the forward portion comprises the tensile force bearing portion. Hence, the tether portion may be at least partly separated into two, or more, parts which form the tether portion.

For example, according to an exemplifying embodiment, the trailing portion is at least partly separated from, and arranged behind, the forward portion in a forward direction of the tether, wherein the trailing portion forms a fin arranged to align the tether with the relative flow direction of the liquid, when the tether is moving relative to the liquid. A fin may advantageously be provided in order to further improve the self-aligning ability of the tether portion, or to specifically control a specific tether portion which may be provided with a fin having certain functions. For example, the fin, or a plurality of fins along the tether, may advantageously be utilized to control desired tether portions more accurately. According to further various exemplifying embodiments, the fin may be tilted, in a pitch direction, in relation to the tether portion, in order to achieve overcompensation, or further twisting, of the tether in relation to the relative liquid flow direction. The tether may further, according to an exemplifying embodiment, be provided with an asymmetrical cross-sectional profile for providing further twisting or overcompensation of the tether, in the pitch direction, in relation to the relative liquid flow.

The tensile force bearing portion may, according to various exemplifying embodiments of the present invention, comprise at least one tensile member comprising synthetic fiber, carbon fiber, or steel, or other suitable materials, and/or combinations thereof. Hence, self-aligning, high strength, compact and lightweight tethers may be provided using different types of tensile force bearing portion constructions. According to further exemplifying embodiments, the tether portion comprises at least one shell member which forms the outer shape of the tether portion, which shell member comprises at least one of an elastomeric material, a thermoplastic material, a thermoset material, a carbon fiber laminate, a glass fiber laminate, a composite material, a material comprising polyurethane, a polyurethane elastomer material, or other suitable materials, and/or combinations thereof. For example, the tether portion may comprise continuous thermoplastic material, which further may be, at least partly, elastic. Alternatively, the shell member may comprise an outer layer(s) of fiber, or composite, laminates, wherein an inner region may be filled with filler material.

The leading edge of the outer shape of the tether portion may, according to an exemplifying embodiment, be formed in similar manner as on a hydrofoil. For example, the leading edge is rounded, and may further have cross-sectional radii of curvature between 1 cm and 30 cm, or between 2 and 15 cm, or between 2 and 8 cm, or between 3 and 8 cm, at least for a portion of the leading edge. The radius of curvature may further vary along the cross section.

Furthermore, the trailing edge of the outer shape of the tether portion may have a sharp shape pointing in the rearward direction. Hence, the outer shape may have/form a wing-shaped, or drop-shaped, cross-sectional profile, or a wing-like structure. Hence, according to an exemplifying embodiment, the cross-sectional profile of the tether corresponds to a wing profile, which provides reduced drag in relation to a non wing profiled cross-section having the same effective thickness in relation to the relative flow direction of the liquid. Furthermore, with a wing profile, the effective thickness in relation to the relative flow direction of the liquid may be reduced while maintaining the same cross-sectional area of the tensile force bearing portion, which may further reduce the drag.

The trailing edge of the tether portion may also, according to an exemplifying embodiment, comprise a cut-off trailing edge. Hence, the extension, in a direction opposite to the forward direction, of the lateral surface profile of the trailing edge of the tether portion is interrupted.

According to an exemplifying embodiment of the present invention, the tether comprises a plurality of tether portions, or sections, configured to be consecutively arranged, and/or connected, along the main direction of the tether. This is advantageous in that the tether may be handled and transported in separate segments. In particular, separate tether segments facilitate for manufacturing, handling, and mounting of a system comprising the tether, wherein the system according to various exemplifying embodiments, may involve complete tether lengths between 1 and 500 meters, or between 20 and 300 meters, or between 30 and 200 meters. For example, each tether section comprises, at each respective end in the main direction, fastening means for consecutively connecting a plurality of tether sections in order to form a complete tether. Each separate tether section may for example have a length between 1 and 100 meters, or between 5 and 40 meters, in the main direction. For example, the connection means are arranged to allow for relative rotational and/or bending movements between two connected or consecutively arranged tether sections.

The tether may, according to an exemplifying embodiment, comprise a device end portion extending in the main direction, wherein a chord length, i.e. the length in the forward direction, of at least one tether portion increases in a direction towards the device, or towards the device end portion of the tether. Hence, for a tether for securing a moving submerged device to a fixed, or non-moving, support structure, the self-aligning capability of the tether increases in a direction in which the relative speed difference between the liquid flow and the tether increases. This is advantageous in that the tether's ability to self-align is increased in the region of the tether which is subject to higher relative speeds generating higher losses in terms of drag.

Alternatively, the chord length of the tether increases in a direction towards the support structure end portion of the tether, which improves the self-aligning capability of the support structure end portion of the tether. This may e.g. improve the efficiency and operation of the tether near a support structure swivel device.

According to yet an exemplifying embodiment, the tether comprises a support structure end portion extending in the main direction, wherein the support structure end portion is essentially circular. In other words, the end portion which is closest to the support structure, and which typically moves with lower speeds, in relation to the above described part of the tether which is closer to the device, is essentially circular, or provided with an essentially circular cross-sectional profile. Hence, a tether comprising a self-aligning upper portion and a circular lower portion may advantageously be provided. Alternatively, the device end portion of the tether may be circular in order to e.g. facilitate manufacturing.

Moreover, according to an exemplifying embodiment, the tether, at least partly along the main direction, is configured to be able to at least partly twist around an axis extending along the main direction. Hence, depending on different local conditions and relative liquid flow directions at different portions of the tether along the main direction, the tether may twist in order to self-align locally which further reduces drag losses.

According to an exemplifying embodiment, the device comprises at least one moving vehicle configured to generate electrical energy, wherein the tether further comprises means for distributing the generated electrical energy from the moving vehicle to the support structure. Hence, the tether in combination with the moving vehicle forms a submerged power plant system, wherein the generated electrical energy e.g. may be distributed through the tether to an electric grid and/or control system. In particular, this combination allows for an improved stream-driven power plant system having higher efficiency due to less loss from drag when moving through the liquid.

During use, or operation, of the tether in submerged conditions, wherein a device is connected and supported to a support structure, the tether may be required to withstand and support high tensile forces generated by the moving connected submerged device. For example, according to an exemplifying embodiment, the tether is arranged to support at least one submerged moving vehicle generating a tensile force up to 10 MN, 6 MN, 4 MN, 2 MN, 1 MN, 100 kN, 10 kN, or up to 3.5 kN.

Furthermore, the tether may advantageously, for some applications, be arranged such that it is neutrally or essentially neutrally buoyant in the liquid, such as water. The tether may also be buoyant or heavy in the liquid.

According to an exemplifying embodiment, the tether portion is flexible in order to allow for coiling or winding.

According to another aspect of the invention there is provided a submersible plant for generating electrical energy, wherein the submersible plant comprises a stream driven vehicle provided with a turbine, which vehicle is connected to a support structure by a tether as discussed above, and wherein the vehicle is provided with at least one stream-driven wing which is arranged to generate a relative vehicle speed in relation to a stream speed, which relative vehicle speed is at least 2 times, or 4 times, or 10 times, the liquid stream speed.

During operation, the stream-driven wing is angled in relation to the flow direction of the moving liquid and is subjected to forces from the surrounding moving liquid. These forces may be described as two orthogonal components: a drag component which is directed in an aftward direction in relation to and parallel to the wing's direction of travel in relation to the liquid, and a lift component which is orthogonal to the wing's direction of travel in relation to the liquid and directed upwards, or directed away from the support structure. Hence, the lift component is tilted slightly forward in relation to a theoretical line between the support structure and the vehicle, during operation. The lift component may further be described as being composed of two components, a first component acting in a direction of the theoretical line between the support structure and the vehicle, and a forward component acting in a forward direction orthogonal to the theoretical line, i.e. in a forward direction in relation to the movement of the vehicle in relation to the ground. For example, the vehicle accelerates when the forward component of the lift component is larger than the resulting aftward drag component of the system, and operates with a stable speed if the forward lift component equals the resulting aftward drag component of the system. The resulting force of the components of the lift and drag components acting in a direction of the theoretical line is counteracted by the tether and the support structure.

Other objectives, features, and advantages of the present invention will appear from the following detailed disclosure, from the attached dependent claims as well as from the drawings.

BRIEF DESCRIPTION OF THE DRAWINGS

The present invention will now be described in more detail, with reference to the appended drawings showing exemplifying embodiments of the present invention, wherein.

DETAILED DESCRIPTION OF THE INVENTION

Figure 1A:
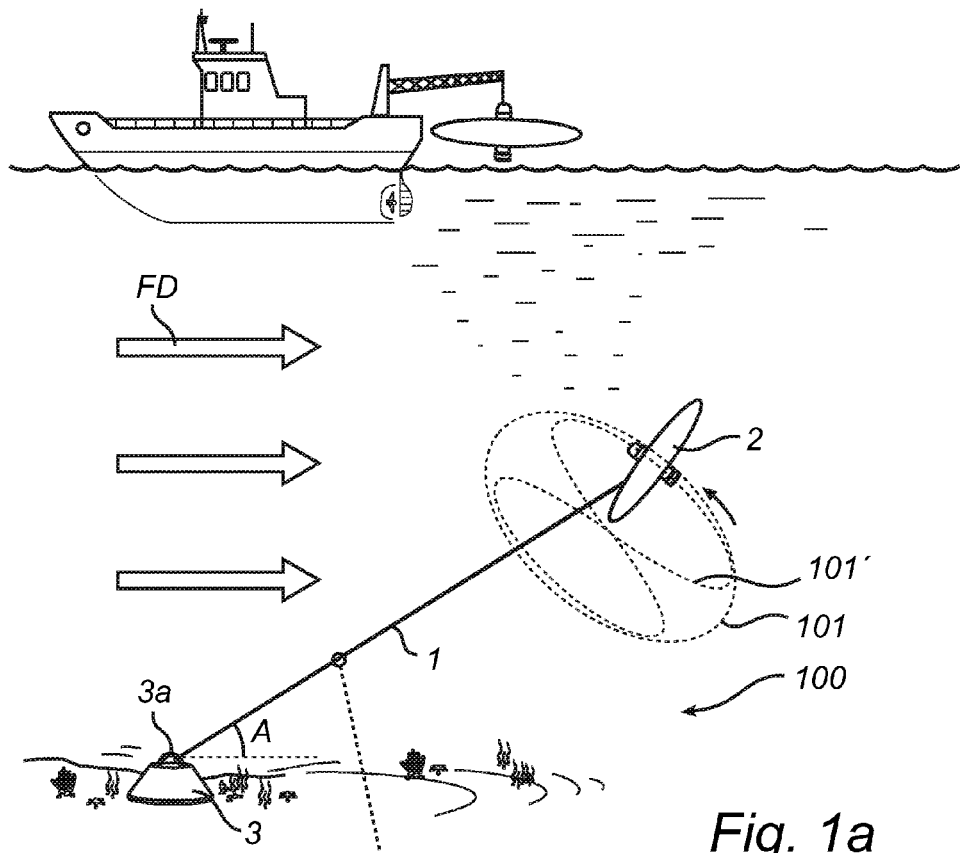
FIG. 1*a* is a schematic side view of an exemplifying embodiment of the tether securing and supporting a submerged and moving stream-driven vehicle to a support structure arranged at the seabed.

In the drawings, similar, or equal elements are referred to by equal reference numerals. The drawings are merely schematic representations, not true to scale and should not be considered as limiting the scope of the invention.

In FIG. 1a, a schematic side view of an exemplifying embodiment of the tether 1 securing and supporting a submerged and moving stream-driven vehicle 2 to a support structure 3 arranged at the seabed, is illustrated. The tether 1, the vehicle 2, and the support structure 3 essentially form a stream-driven submerged power plant system 100, wherein electrical energy is generated in the vehicle 2 by a turbine and generator. A liquid, typically water, has a flow direction FD, wherein the vehicle utilizes the energy of the flowing water in order to move along a submerged trajectory 101 or 101', such as a circulating, and/or endless trajectory. The trajectory may have an annular or circular shape, as illustrated by 101. The trajectory may further be formed similar to the digit eight, as illustrated by trajectory 101'. The trajectory 101, or 101', follows an essentially spherical surface with a bending radius essentially equal to the length of the tether 1. It is noted that trajectories 101 and 101' area only schematically illustrated. During its passing through the water, the vehicle may skid, or drift, at least some amount in a transverse direction, in relation to a trajectory direction, which may result in that the vehicle and tether, at least at some parts along the trajectory, are subjected to a tilted, or inclined, actual velocity in relation to a body fixed forward direction f of the tether, wherein the tether strives to self-align in relation to the relative liquid flow direction resulting from the actual velocity of the tether and the actual velocity of the liquid flow. Hence, losses from drag are advantageously reduced during operation of the vehicle. The vehicle may further be provided with steering means, comprising e.g. one or a plurality of steering control surfaces, such as the operative surfaces of a controllable and pivotable steering rudder, and a control unit arranged to control the operation of the steering means for steering the vehicle according to a predetermined trajectory, such as 101, or 101'. During operation of the vehicle, the tether will typically be stretched out such that the trajectory is arranged in, or follow, an essentially spherical surface. Furthermore, to provide stream-driven operation, the trajectory of the vehicle at least partly crosses the flow direction FD.

Figure 1B:
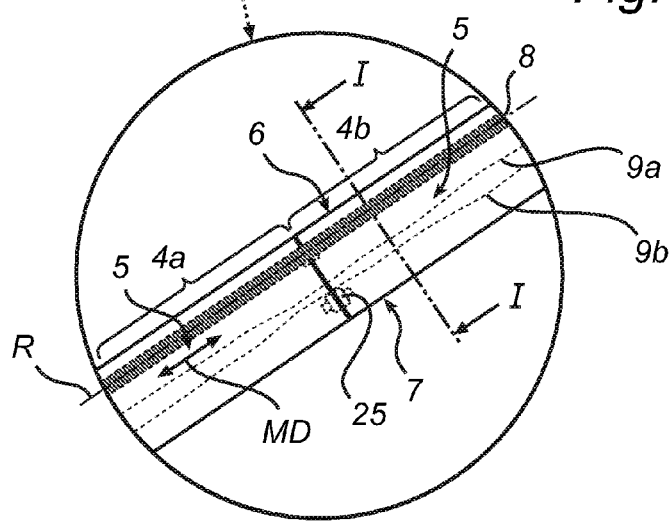
FIG. 1*b* is a schematic zoom-in view of the tether in FIG. 1*a* according to an exemplifying embodiment of the present invention.

In FIG. 1b, a schematic partial zoom-in view of the tether in FIG. 1a according to an exemplifying embodiment of the present invention, is illustrated. The tether comprises a first tether portion, or section, 4a and a second tether portion, or section, 4b which are connected by connecting means 25. The tether 1 further comprises an outer shape 5 including a leading edge 6 and a trailing edge 7, each extending in the main direction MD. The tether 1, in the exemplified embodiment, further comprises a tensile force bearing portion 8, extending through the tether portions 4a, 4b, wherein also the tensile force bearing portions of the respective tether portions are connected at the connected ends of the tether portions 4a, 4b. However, the tether is not limited to this design. For example, the tether portions may also share a common tensile force bearing portion extending essentially along the full length of the tether, or a common tensile force bearing portion comprising a plurality of tensile members each extending along essentially the full length of the tether.

During operation, the tether 1 is arranged to self-align in relation to a relative flow direction of the liquid, by rotating around a rotational axis R, or tether pitch axis, essentially parallel with the main direction MD of the tether, when the tether portion is moving through the liquid. As illustrated in FIG. 1b, the rotational axis R essentially coincides with the resulting center point, or axis, of the tensile force bearing portion 8. This may not, however, always be the case.

According to various exemplifying embodiments, the rotational axis R may be located in front of, or behind, the resulting center point of the tensile force bearing portion 8, in a body fixed forward direction of the tether.

The tether 1 further comprises means 9a, 9b, such as power cables, or signal cables, for distributing the generated electrical energy from the moving vehicle to an electric grid (e.g. grid 28 in FIG. 4) via a grid connection in the support structure, and to allow for communication between a control system in e.g. the vehicle and external control systems.

Figure 2:
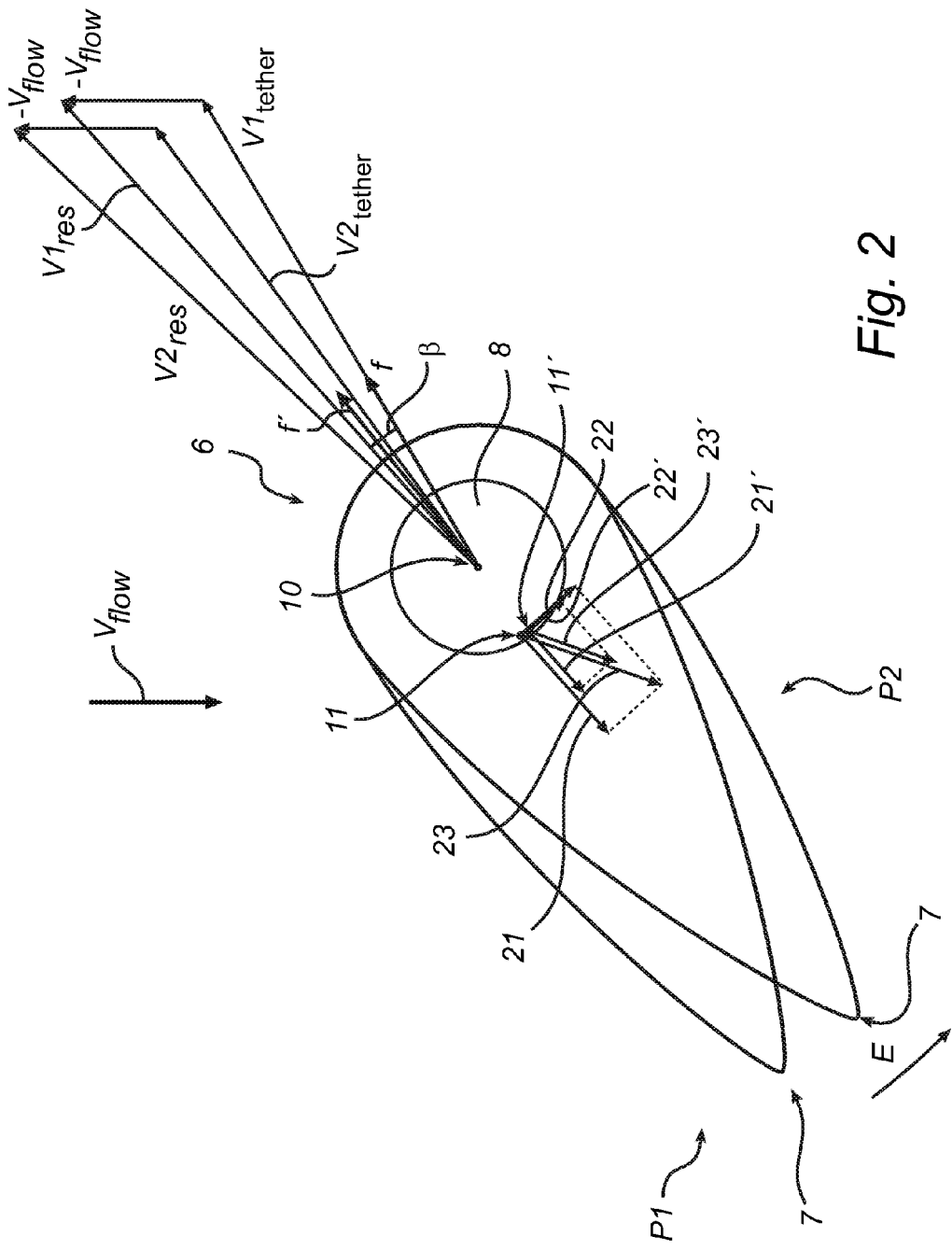
FIG. 2 is a schematic cross-sectional view of an exemplifying embodiment of the tether according to the present invention, shown in two different angles in relation to a flow direction.

In FIG. 2, a schematic cross-sectional view of an exemplifying embodiment of the tether according to the present invention, shown in two different angles in relation to a flow direction, is illustrated. It is noted that angles, speed magnitudes and speed directions in the illustrated view are not meant to be drawn to scale and might be exaggerated for illustrative purposes.

In a first example, the tether moves with an actual velocity $V1_{tether}$, having an actual direction coinciding with a body fixed forward direction f of the tether, wherein the velocity $V1_{tether}$ is representative of the velocity of the tether in relation to the ground. In a first exemplifying position P1, the tether is tilted, or rotated, in relation to a flow velocity component $V_{flow}$, and comprises a leading edge 6, a trailing edge 7, and a tensile force bearing portion 8 having a circular cross-section, wherein a resulting center point 10 of the tensile force bearing portion 8 is positioned in a geometrical center point of the tensile force bearing portion 8, wherein the resulting center point 10, at least in this case, coincides with the rotational axis of the tether. Furthermore, the tether comprises a hydrodynamic center point of pressure 11, which is the resulting point of action of the hydrodynamic forces acting on the tether or on the outer shape of the tether. As further illustrated, the resulting center point 10 of the tensile force bearing portion 8 and/or the rotational axis of the tether is located in front of the hydrodynamic center point of pressure 11, in a body fixed forward direction f from the trailing edge 7 to the leading edge 6. Thereby, a resulting force 23 exerted on the tether during relative movement in relation to the liquid will allow the tether to self-align by rotating, in a tether pitch direction as indicated by E, to a second exemplifying position P2. In particular, the point of action of the resulting force 23 generates a moment arm in relation to the rotational axis of the tether and/or resulting center point 10 of the tensile force bearing portion 8, which resulting force 23 strives to align the tether such that a side-slip angle β between the resulting relative velocity $V1_{res}$ (given by $V1_{res}=V1_{tether}-V_{flow}$) and the body fixed forward direction f of the tether is reduced. The resulting force 23 may further be divided into a drag force 21 acting in an opposite direction in relation to the resulting relative velocity $V1_{res}$ and a lift force 22 which is orthogonal to the drag force 21, as illustrated, wherein each one of the drag force and the lift force may generate a moment acting on, and striving to align, the tether.

In the second exemplifying position P2, the resulting center point 10 and the hydrodynamic center point of pressure 11' are more aligned in relation to the resulting relative velocity $V1_{res}$ such that the resulting force 23' includes a reduced drag force component 21' and a reduced lift force component 22'. For example, by aligning in relation to the resulting relative velocity, the tether will have a reduced effective, or projected, area in relation to the resulting relative velocity which will reduce the tether's form drag.

According to a second example, with reference to position P1, the tether may move with an actual velocity $V2_{tether}$ which is angled in relation to the body fixed forward direction f, for example due to sliding, or skidding, of the vehicle during a turning motion along the trajectory. Hence, the side-slip angle between the $V2_{res}$ (given by $V2_{res}=V2_{tether}-V_{flow}$) and the body fixed forward direction f of the tether, and thus the moment generated by the resulting force striving to align the tether, is increased in relation to the above described first example. Generally, as exemplified in the two above described non-limiting conceptual examples, the tether will strive to align into an improved, or optimized, pitch orientation in relation to the flow velocity and the actual velocity $V1_{tether}$ or $V2_{tether}$ of the tether. It is noted, however, that the above examples are simplifications of interactions between the tether and the liquid occurring in three dimensions, not only in the cross-sectional plane of the tether. It is further noted that, during application of the tether in combination with a stream-driven vehicle and a support structure, the resulting relative velocity $V1_{res}$ or $V2_{res}$ between the tether and the liquid will vary along the main direction of the tether. This means that also the side-slip angle β will vary along the main direction, wherein the tether may align locally along the main direction such that the local side-slip angle β is reduced.

In FIGS. 3a-e, schematic cross-sectional views of various exemplifying embodiments of the tether according to the present invention, taken through I-I in FIG. 1b, are illustrated. If not stated or illustrated otherwise, each tether 1 in FIGS. 3a-e is arranged in a corresponding manner, and comprises an outer shape 5 with a leading edge 6 and a trailing edge 7, a forward direction defined from the trailing edge 7 to the leading edge 6, at least one tensile force bearing portion 8, and means 9a, 9b, such as power cables, and/or signal cables. Furthermore, each tether 1 comprises a rotational axis and/or resulting center point 10 of the tensile force bearing portion located in front of a hydrodynamic center point of pressure 11, in the body fixed forward direction f.

Figure 3A:
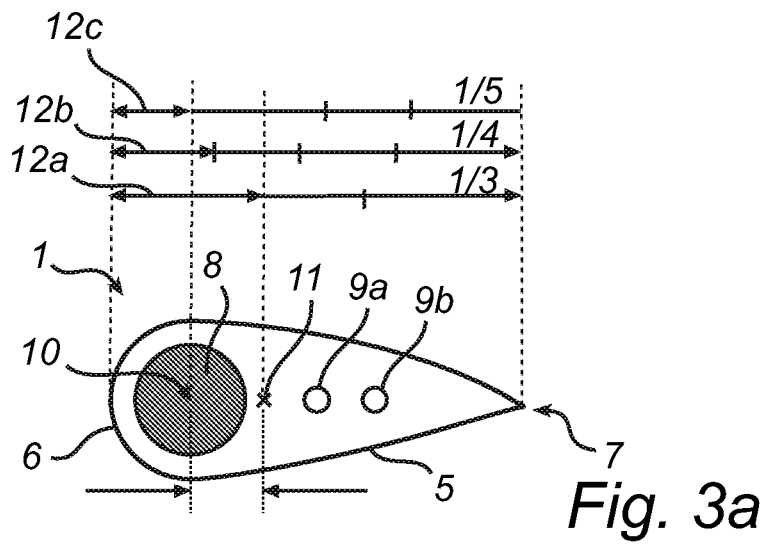
FIGS. 3*a-e* show schematic cross-sectional views of various exemplifying embodiments of the tether according to the present invention, taken through I-I in FIG. 1*b*.

In FIG. 3a, the tensile force bearing portion has a round cross-sectional shape, and may e.g. be formed of one or a plurality of wires, steel wires, ropes, carbon fiber members, or other suitable materials, and/or combinations thereof, wherein the outer shape 5 of the tether comprises elastomeric material, thermoplastic material, carbon fiber laminate, glass fiber laminate, composite material, high strength plastic, or other suitable materials, and/or combinations thereof. As further exemplified in FIG. 3a, depending on the configuration of the tether, the center point 10 of the tensile force bearing portion may be located in the leading fifth portion 12c, and/or in the leading fourth portion 12b, and/or in the leading third portion 12a of the tether, in the body fixed forward direction f.

Figure 3B:
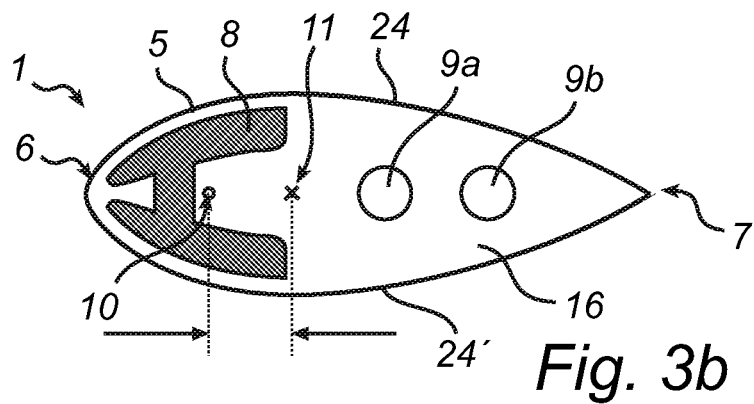

In FIG. 3b, the tensile force bearing portion has a more complex structure, and comprises two lateral portions extending at least partly along respective lateral sides 24, 24' in a forward portion of the tether, which lateral portions are connected by a transverse member. In other words, the tensile force bearing portion is essentially H-shaped, or has a tapered H-shape. Furthermore, the resulting center point 10 is located outside the tensile force bearing portion 8, between rear parts of the lateral portions.

Figure 3C:
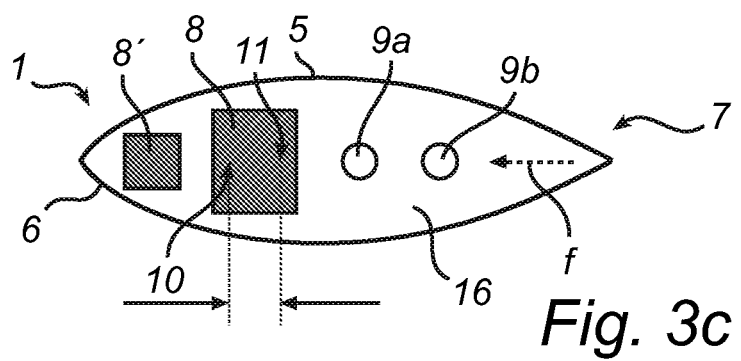

In FIG. 3c, the tensile force bearing portion comprises a first and a second tensile member 8, and 8' arranged adjacent each other in a forward portion of the tether, each member being essentially square-shaped.

Figure 3D:
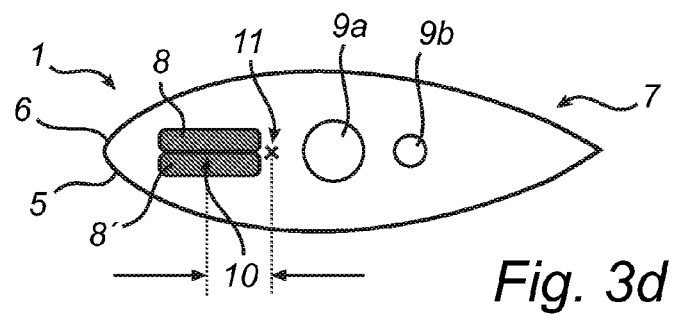

In FIG. 3d, the tensile force bearing portion comprises a first and a second tensile member 8, and 8' formed of strapping members arranged in a symmetrical configuration facing each other.

Figure 3E:
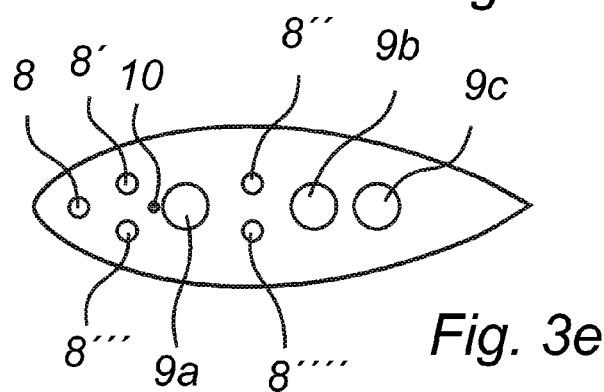

In FIG. 3e, the tensile force bearing portion comprises a plurality of separated and spread out tensile members 8, 8', 8'', 8''', 8''''.

Figure 3F:
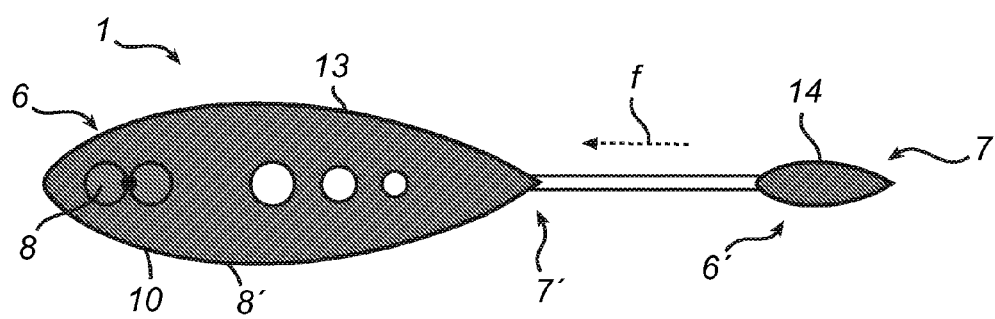
FIG. 3*f* is a schematic cross-sectional view of an exemplifying embodiment of the tether according to the present invention, taken through II-II in FIG. 4.
Figure 4:
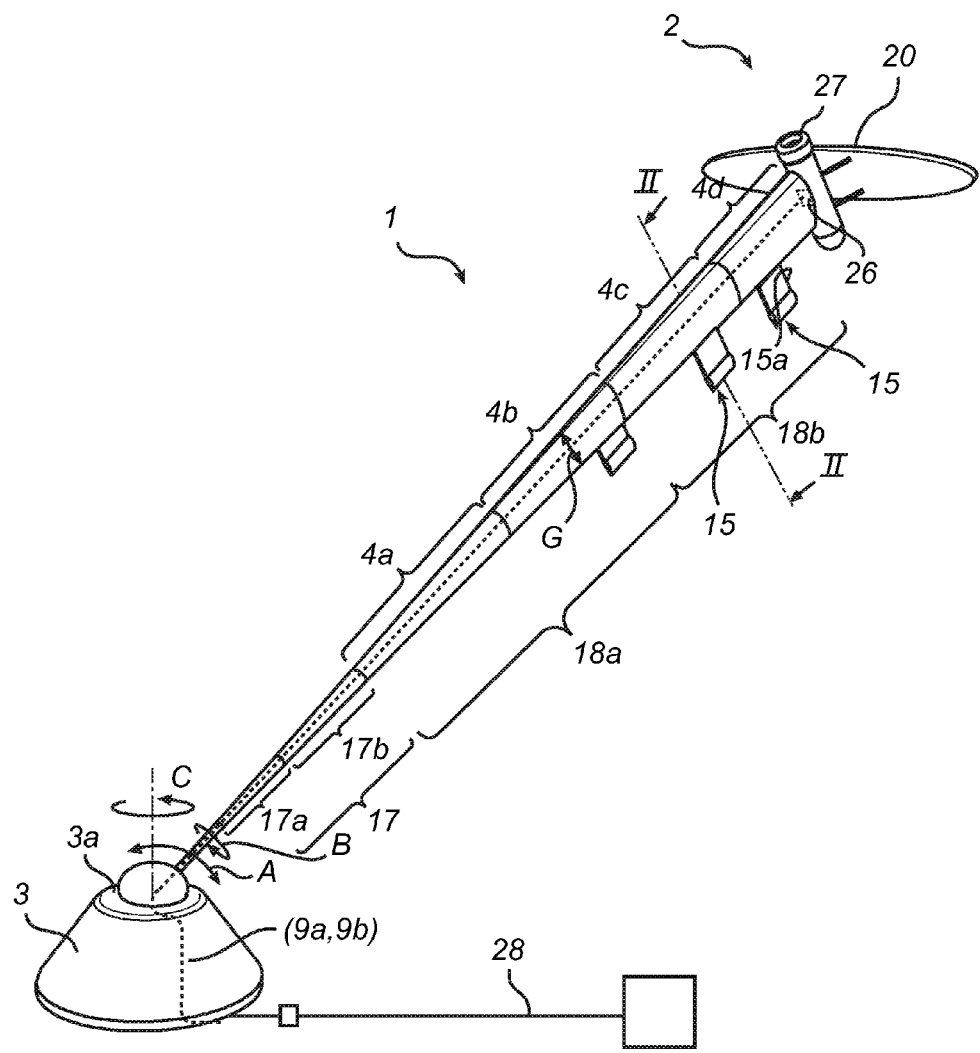
FIG. 4 is a schematic perspective view of an exemplifying embodiment of the tether securing and supporting a submerged and moving stream-driven vehicle to a support structure arranged at the seabed.

In FIG. 3f, a schematic cross-sectional view of an exemplifying embodiment of the tether according to the present invention, taken through II-II in FIG. 4, is illustrated. The tether comprises a forward portion 13 comprising leading edge 6 and trailing edge 7', and a rear portion 14 comprising leading edge 6' and trailing edge 7, wherein the forward portion comprises the tensile force bearing portion which comprises tensile members 8 and 8' which are spread out in an aligned configuration in relation to each other along the body fixed forward direction f. Furthermore, the rear portion 14 is at least partly separated from, and arranged behind, the forward portion 13 in the forward direction f of the tether, wherein the trailing portion 14 forms a fin arranged to align the tether with the relative flow direction of the liquid, when the tether is moving through the liquid.

For example, the tensile members comprise a plurality of relatively thin carbon fiber composite rods, wherein the bearing function of the tensile force acting on the tether during operation is essentially evenly distributed between the plurality of rods. The rods may further be arranged to be able to relocate in relation to each other into a flat configuration, or profile, for example by providing an internal cavity extending in the main direction MD in the tether, such that the rods e.g. may bend with essentially the same bending radius.

The tensile force bearing portion, or the tensile members, may alternatively, or optionally, comprise synthetic fibers which allows for a flexible and thus robust and logistically beneficial tether, e.g. allowing for coiling or winding. For example, the tensile force bearing portion comprises UHM-WPE (Ultra-high-molecular-weight polyethylene), for example Dyneema, or similar high performance fibers. Furthermore, a steel wire rope, or steel wire ropes, may be utilized as tensile force bearing portion, or as tensile members, e.g. in similar arrangements as described in relation to the composite rods. Steel wire has e.g. beneficial properties in terms of long term form stability.

FIG. 4 schematically illustrates a perspective view of an exemplifying embodiment of the tether 1 securing and supporting a submerged and moving stream-driven vehicle 2 to a support structure 3 arranged at the seabed. The tether 1 comprises a lower support structure end portion 17 which is essentially circular. In a middle portion 18a, the tether comprises tether sections, or tether portions, 4a, 4b having increasing chord length G, in a direction towards the vehicle end portion 18b comprising tether sections 4c and 4d which also may have increasing chord lengths, or, alternatively, constant chord lengths or decreasing chord lengths.

The lower support structure end portion 17 is attached to a swivel device 3a of the support structure 3, which swivel device 3a allows for free angular movement of the tether 1 in A, B and C directions, such that the vehicle 2 may move and turn along the intended trajectory. As further illustrated, the tether comprises internal means 9a, 9b, which connect the vehicle and a control unit 26 of the vehicle with the support structure 3. The vehicle 2 further comprises a turbine/generator unit 27 which may comprise a turbine device connected to a generator device, a wing 20 angled towards the support structure, and steering means comprising e.g. a, or a plurality of, steering control surfaces controlled by the control unit 26. Tether portions 4b, 4c, and 4d are further provided with a respective fin 15 attached via fin supports 15a.

It should be noted that the invention has mainly been described above with reference to a few exemplifying embodiments. However, as is readily appreciated by a person skilled in the art, other embodiments than the ones disclosed above are equally possible within the scope of the invention, as defined by the appended patent claims. For example, the tether may be used for supporting and operating a plurality of different submerged devices at similar or different relative stream flows and device speeds. The tether may further be used for supporting fixed, or essentially fixed, submerged devices in locations with high stream flow speeds, and as a towline for submerged devices being towed after a towing device. It is further noted that, in the claims, the word "comprising" does not exclude other elements or steps, and the indefinite article "a" or "an" does not exclude a plurality. A single apparatus or other unit may fulfill the functions of several items recited in the claims. The mere fact that certain features or measures are recited in mutually different dependent claims does not indicate that a combination of these features or measures cannot be used to advantage.

The invention claimed is:

1. A tether for connecting a moving stream-driven device submerged in liquid to a fixed support structure arranged at a seabed, which tether extends in a main direction (MD) and where the tether comprises a plurality of separate tether portions which are connected together to form the whole tether, wherein the tether portions of the tether comprise,
   an outer shape having a leading edge and a trailing edge, each edge extending in the main direction,
   at least one tensile force bearing portion extending in the main direction of the tether, and
   power cables that are separate from the tensile force bearing portion and are configured to distribute electrical energy generated by the stream-driven device to an electric grid,
   wherein the tether portions are arranged to strive to self-align in relation to a relative flow direction of the liquid, by rotating around a rotational axis that is located in the tensile force bearing portion and is essentially parallel with the main direction of the tether when the tether portions are moving through the liquid, and where the tether is configured to allow for twisting at least partly at different tether portions along the main direction in order to self-align locally,
   wherein at least some of the tether portions are connected at portions thereof other than the tensile force bearing portion, and
   wherein the tether comprises a support structure end portion extending in the main direction and attached to the support structure, and a chord length of the tether increases in a direction towards the support structure end portion of the tether so that the chord length increases toward the seabed.

2. The tether according to claim 1, wherein the rotational axis is located in front of a hydrodynamic center point of pressure of the tether portion, in a forward direction (f) from the trailing edge to the leading edge essentially perpendicular to the main direction.

3. The tether according to claim 2, wherein a resulting center point of the tensile force bearing portion, during use, is located in a leading third part, or in a leading fourth part, or in a leading fifth part, or in a leading tenth part, or in a leading twentieth part of the tether portion.

4. The tether according to claim 1, wherein the tether portion comprises a forward portion comprising the leading edge, and a rear portion comprising the trailing edge, wherein the forward portion comprises the tensile force bearing portion.

5. The tether according to claim 4, wherein the rear portion is at least partly separated from, and arranged behind, the forward portion in a forward direction (f) of the tether, wherein the trailing portion forms a fin arranged for aligning the tether with the relative flow direction of the liquid, when the tether is moving through the liquid.

6. The tether according to claim 1, wherein the tensile force bearing portion comprises at least one tensile member comprising fiber, synthetic fiber, carbon fiber, steel, or combinations thereof.

7. The tether according to claim 1, wherein the tether portion comprises at least one shell member which forms the outer shape of the tether portion, which shell member comprises at least one of an elastomeric material, a thermoplastic material, a thermoset material, a carbon fiber laminate, a glass fiber laminate, a composite material, a material comprising or being formed of polyurethane, or combinations thereof.

8. The tether according to claim 1, wherein the leading edge of the outer shape of the tether portion is formed as a leading edge of a hydrofoil.

9. The tether according to claim 1, wherein the tether portions are consecutively arranged along the main direction of the tether.

10. The tether according to claim 1, wherein the support structure end portion is essentially circular.

11. A tether according to claim 1, wherein the tether is arranged such that it is neutrally or essentially neutrally buoyant in the liquid.

12. A tether according to claim 1, wherein the device comprises at least one moving vehicle configured to generate electrical energy,
   wherein the power cables further distribute the generated electrical energy from the moving vehicle to the support structure.

13. A tether according to claim 1, wherein the tether portion is flexible in order to allow for coiling or winding.

14. A tether according to claim 1, wherein the tether is arranged to support at least one submerged moving vehicle generating a tensile force up to 6 MN, 4 MN, 2 MN, 1 MN, 100 kN, 10 kN, or 3.5 kN.

15. The tether according to claim 1, wherein the cross-sectional profile of the tether is asymmetrical.

16. A submersible plant for generating electrical energy comprising a stream-driven vehicle provided with a turbine, which vehicle is connected to a support structure by the tether according to claim 1,
   wherein the vehicle is provided with at least one stream-driven wing which is arranged to generate a relative vehicle speed in relation to a liquid stream speed, which relative vehicle speed is at least 2 times, or 4 times, or 10 times, the liquid stream speed.

\* \* \* \* \*